United States Patent
Cordery et al.

(10) Patent No.: US 7,971,061 B2
(45) Date of Patent: Jun. 28, 2011

(54) E-MAIL SYSTEM AND METHOD HAVING CERTIFIED OPT-IN CAPABILITIES

(75) Inventors: Robert A. Cordery, Danbury, CT (US); John F. Braun, Fairfield, CT (US); Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 1233 days.

(21) Appl. No.: 11/636,816

(22) Filed: Dec. 11, 2006

(65) Prior Publication Data
US 2008/0141026 A1    Jun. 12, 2008

(51) Int. Cl.
*H04L 9/32*   (2006.01)
*H04L 29/06*   (2006.01)
*G06F 15/16*   (2006.01)

(52) U.S. Cl. ........ 713/170; 709/206; 713/155; 713/156; 713/157; 713/158; 713/154; 713/160

(58) Field of Classification Search .................. 713/154, 713/160, 170; 709/206
See application file for complete search history.

(56) References Cited

U.S. PATENT DOCUMENTS

| | | | |
|---|---|---|---|
| 7,039,949 B2 | 5/2006 | Cartmell et al. | |
| 7,130,885 B2 * | 10/2006 | Chandra et al. | 709/206 |
| 7,444,380 B1 * | 10/2008 | Diamond | 709/206 |
| 7,548,620 B2 * | 6/2009 | Popp | 380/273 |
| 2002/0064283 A1 * | 5/2002 | Parenty | 380/277 |
| 2002/0114466 A1 * | 8/2002 | Tanaka et al. | 380/232 |
| 2002/0120600 A1 * | 8/2002 | Schiavone et al. | 707/1 |
| 2002/0198745 A1 * | 12/2002 | Scheinuk et al. | 705/4 |
| 2004/0117451 A1 * | 6/2004 | Chung | 709/207 |
| 2004/0205135 A1 * | 10/2004 | Hallam-Baker | 709/206 |
| 2005/0193075 A1 * | 9/2005 | Haff et al. | 709/206 |
| 2005/0198508 A1 * | 9/2005 | Beck | 713/170 |
| 2005/0246534 A1 * | 11/2005 | Kirkup et al. | 713/170 |
| 2006/0059346 A1 * | 3/2006 | Sherman et al. | 713/175 |
| 2006/0204011 A1 * | 9/2006 | Adams et al. | 380/282 |

OTHER PUBLICATIONS

Coravue, "Improving Newsletter Delivery with Certified Opt-in E-mail", 2002, pp. 1-8.*

* cited by examiner

*Primary Examiner* — Kaveh Abrishamkar
*Assistant Examiner* — Trang Doan
(74) *Attorney, Agent, or Firm* — Brian A. Lemm; Charles R. Malandra, Jr.

(57) ABSTRACT

An opt-in email system in which a recipient that has opted in to an email list can recognize and trust that an email has actually come from a desired sender. When a recipient desires to opt-in to an e-mail list, the recipient is sent to a trusted third party certification service that generates a certificate associated with a key pair. A key is maintained at the sender's location by a secure cryptographic device that can verify the certificate and create a signature, using a key of the key pair, for messages intended for the recipient. When a message intended for the recipient is received from the sender, the signature will be verified based on the status of the certificate and the corresponding key of the key pair. If the signature does not verify, it indicates that the recipient has not opted-in to receive emails from this sender.

15 Claims, 3 Drawing Sheets

E-MAIL SYSTEM AND METHOD HAVING CERTIFIED OPT-IN CAPABILITIES

FIELD OF THE INVENTION

The present invention relates to electronic mail (email) systems, and in particular to an email system that is able to certify to a recipient that certain emails are being received from a particular sender wherein the recipient has previously decide to opt-in to an email list of that sender.

BACKGROUND OF THE INVENTION

The dramatic increase in unsolicited emails, commonly referred to as spam, has led business emailers to develop a number of mechanisms aimed at increasing the likelihood that emails will reach and be read by the intended recipients. One such mechanism is to create and maintain opt-in email lists, wherein potential recipients are able to affirmatively choose to be included on an email list of a business emailer and receive emails from that emailer. However, even in situations where a recipient has opted-in to receive emails from a specific emailer, it is sometimes difficult for the recipient to recognize an email, such as a marketing email, sent from that emailer (as distinguished from unwanted spam). As a result, the recipient may inadvertently ignore and/or delete an email that came from the emailer even though the recipient had previously opted-in to receive such emails. In addition, unscrupulous emailers may use the process wherein a previously opted-in recipient chooses instead to now opt-out as a sign that the email address of that recipient is live and in use, and may therefore increase the volume of unwanted emails to that address. Thus, there is a need for an opt-in email system in which a recipient that has opted in to an email list can recognize and trust that an email has actually come from the desired emailer (i.e., the one that they opted-in to receive email from) and which ensures that emails are no longer sent once a recipient has decided to opt-out of the email list.

SUMMARY OF THE INVENTION

In one embodiment, the invention provides a method of processing an email generated by an emailer and intended for a recipient, wherein the emailer maintains an opt-in email list. The method includes receiving the email at, for example, an email service provider of the recipient or at the recipient's email application, wherein the email includes an information portion and an authentication portion. The authentication portion is generated from the information portion using a first key associated with both the recipient and the opt-in email list in a manner that causes the authentication portion to be securely cryptographically linked to the information portion of the email. The method further includes obtaining, such as from storage, a certificate generated by a trusted third party, wherein the certificate is generated by the trusted third party in response to the recipient opting-in to the opt-in email list. The certificate includes a certificate key associated with both the recipient and the opt-in email list and that indicates that the certificate key can be trusted. The certificate is digitally signed by the trusted third party. The method also includes steps of determining whether the certificate can be verified, determining whether the authentication portion can be verified using the certificate key, and providing the email to the recipient only if the certificate and the authentication portion are successfully verified.

In another embodiment, the invention provides a method of adding a recipient to an opt-in email list maintained by an emailer and generating an email intended for the recipient. The method includes receiving a request from the recipient to be added to the opt-in email list, and directing the recipient to a trusted third party, wherein the trusted third party generates a certificate in response thereto. The certificate generated by the trusted third party includes a certificate key associated with both the recipient and the opt-in email list and indicates that the certificate key can be trusted. The certificate is digitally signed by the trusted third party. The method further includes generating the email that includes an information portion and an authentication portion. The authentication portion is generated using a secure cryptographic device. The email is sent to the recipient. The authentication portion is generated by the secure cryptographic device from the information portion using a first key associated with both the recipient and the opt-in email list in a manner that causes the authentication portion to be securely cryptographically linked to the information portion. Also, the first key is stored by the secure cryptographic device. Also, the certificate is provided by the trusted third party to at least one of an email service provider of the recipient and an email application of the recipient, and the email is provided to the recipient by either of the email service provider and the email application of the recipient only if the email service provider or the email application, whichever is appropriate, is able to successfully verify the certificate and successfully verify the authentication portion using the certificate key.

In still another embodiment, the invention provides a method of adding a recipient to an opt-in email list maintained by an emailer and generating an email intended for the recipient. The method includes receiving a request from the recipient to be added to the opt-in email list, and directing the recipient to a trusted third party, wherein the trusted third party generates a certificate in response thereto. The certificate includes a certificate key associated with both the recipient and the opt-in email list and indicates that the certificate key can be trusted. The certificate is digitally signed by the trusted third party. The method further includes obtaining the certificate and determining whether the certificate can be verified, generating the email if the certificate can be verified, and sending the email to the recipient. The email that is generated if the certificate can be verified includes an information portion and an authentication portion, wherein the authentication portion is generated by a secure cryptographic device from the information portion using a first key associated with the recipient and the opt-in email list in a manner that causes the authentication portion to be securely cryptographically linked to the information portion. The first key is stored by the secure cryptographic device. Also, the email is provided to the recipient by either of an email service provider of the recipient or an email application of the recipient if the email service provider or the email application, whichever is appropriate, is able to successfully verify the authentication portion using the certificate key.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
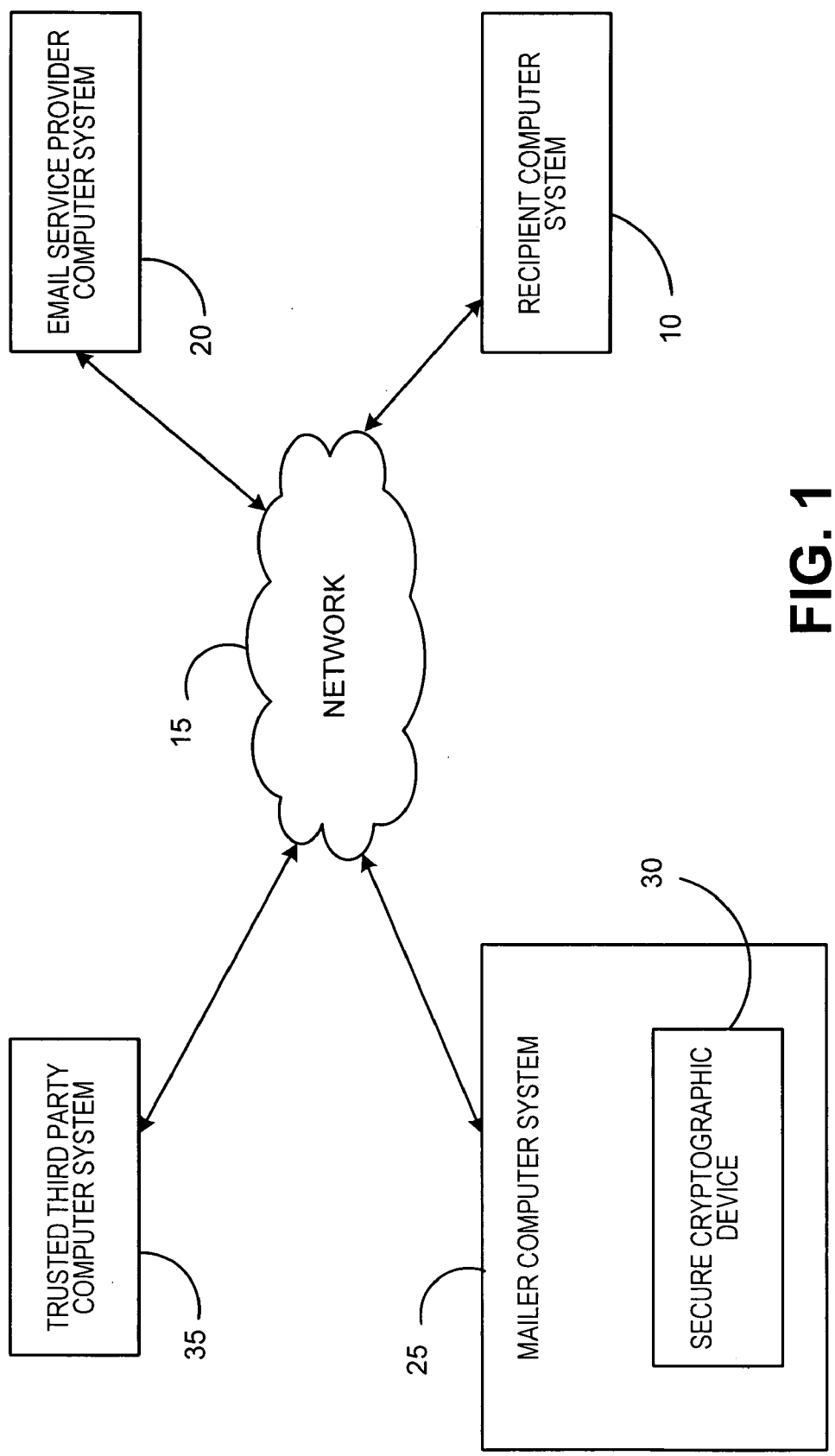
FIG. 1 is a block diagram of a certified opt-in email system according to an embodiment of the present invention.

FIG. 1 is a block diagram of a certified opt-in email system 5 according to a first particular embodiment of the present invention. The certified opt-in email system 5 includes a recipient computer system 10 that is in electronic communication with a network 15, which may be, for example, the Internet, one or more private computer networks, or any combination thereof. The recipient computer system 10 includes an email application for enabling a recipient (i.e., a user) to send and receive emails through the network 15 with the assistance of the email service provider computer system 20 described below. The recipient computer system 10 also includes a browser application for accessing web sites through the network 15. The certified opt-in email system 5 further includes an email service provider computer system 20 that is also in electronic communication with the network 15. The email service provider computer system 20 is operated by a third party service provider that provides email services to the recipient (and in particular, to the recipient computer system 10). The certified opt-in email system 5 still further includes a mailer computer system 25 that is in electronic communication with the network 15. As described in greater detail below, the mailer computer system 25 is operated by a business mailer that maintains an opt-in email list to which the recipient described above becomes a member (i.e., the recipient opts-in to the email list). As seen in FIG. 1, the mailer computer system 25 includes a secure cryptographic device 30, such as a secure coprocessor, that stores cryptographic keys and associated cryptographic algorithms (which are executed by the secure cryptographic device 30) for encrypting and/or digitally signing data as described elsewhere herein. In addition, the mailer computer system 25 includes a web server for maintaining a web site having one or more web pages that may be accessed by the recipient computer system 10 (and in particular the browser thereof) through the network 15. Finally, the certified opt-in email system 5 includes a trusted third party computer system 35 that is also in electronic communication with the network 15. The trusted third party computer system 35 is operated by a trusted third party service provider that provides the certification services described elsewhere herein. While only a single recipient computer system 10, email service provider computer system 20 and mailer computer system 25 are shown in FIG. 1 for illustrative purposes, it should be understood that multiples one of such components may be employed in the certified opt-in email system 5.

Figure 2:
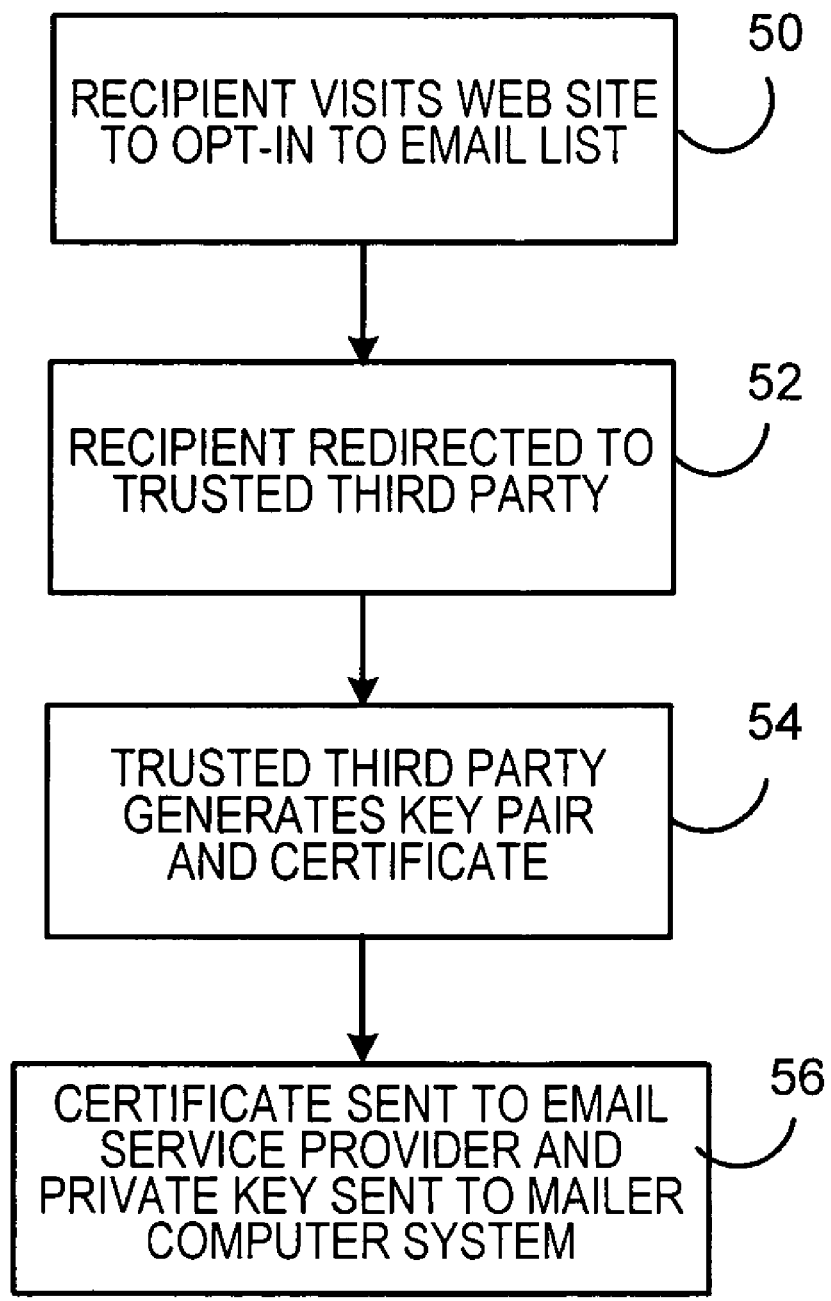
FIG. 2 is a flow diagram of the operation of the system illustrated in FIG. 1 for a recipient to opt-in to an e-mail list.

FIG. 2 illustrates in flow diagram form the operation of the system 5 for a recipient to opt-in to an e-mail list. When the recipient desires to opt-in to an email list maintained by the business mailer that operates the mailer computer system 25, in step 50 the recipient visits a web site maintained by the mailer computer system 25 using the browser application of the recipient computer system 10. When the recipient indicates that he or she wishes to opt-in to the email list, in step 52 the recipient is redirected through the network 15, preferably through a secure socket layer (SSL) connection, to the trusted third party computer system 35. Preferably, the recipient is required to provide certain information to the trusted third party computer system 35, such as, for example and without limitation, a name, address, and active email address. Optionally, the third party computer system 35 may verify the authenticity of the name and address, such as, for example, by sending an e-mail to the provided email address and requesting a confirmation that the recipient does actually desire to opt-in to the email list. In response, the trusted third party computer system 35 in step 54 generates a public key/private key pair for the recipient and the email list in question and a certificate associated with the key pair. The term certificate as used herein shall refer to a message that is digitally signed by the trusted third party and that includes a copy of a particular key and that enables a third party to verify that the message was signed by no one other than the trusted third party to thereby develop trust in the key. For example, in the above described embodiment where public key cryptography techniques are to be used and where a public/private key pair is generated by the trusted third party computer system 35, the certificate may be a known type of public key certificate that includes, without limitation, the recipient's name, the business mailer's name, a serial number, a copy of the public key, and the digital signature of the trusted third party (i.e., the certificate-issuing authority) created using the trusted third party's private key so that a party receiving the certificate can verify that the certificate is real. In the particular embodiment currently being described, the certificate will also have an expiration date, the significance of which will be explained below.

In step 56 the trusted third party computer system 35 sends the certificate (which includes the public key generated by the trusted third party computer system 35) to the email service provider computer system 20 through the network 15, where it is stored in a readily accessible fashion, such as in a database forming a part of the email service provider computer system 20. In addition, the trusted third party computer system 35 sends the private key to the mailer computer system 25. Preferably, the private key is stored encrypted on the mailer computer system 25, and the decryption key that enables decryption of the private key is stored in the secure cryptographic device 30. Alternatively, the private key could be stored directly in the secure cryptographic device 30. The term "stored by the secure cryptographic device" as used herein includes both storing the private key in encrypted form on the mailer computer system 25 with the corresponding decryption key stored in the secure cryptographic device 30 and storing the private key directly in the secure cryptographic device 30. Preferably, the private key is sent to the mailer computer system 25 in a secure (e.g., encrypted) manner using any of a number of known key distribution techniques. For example, the secure cryptographic device 30 may have a communication key for communicating with the trusted third party computer system 35 in an encrypted manner.

Figure 3:
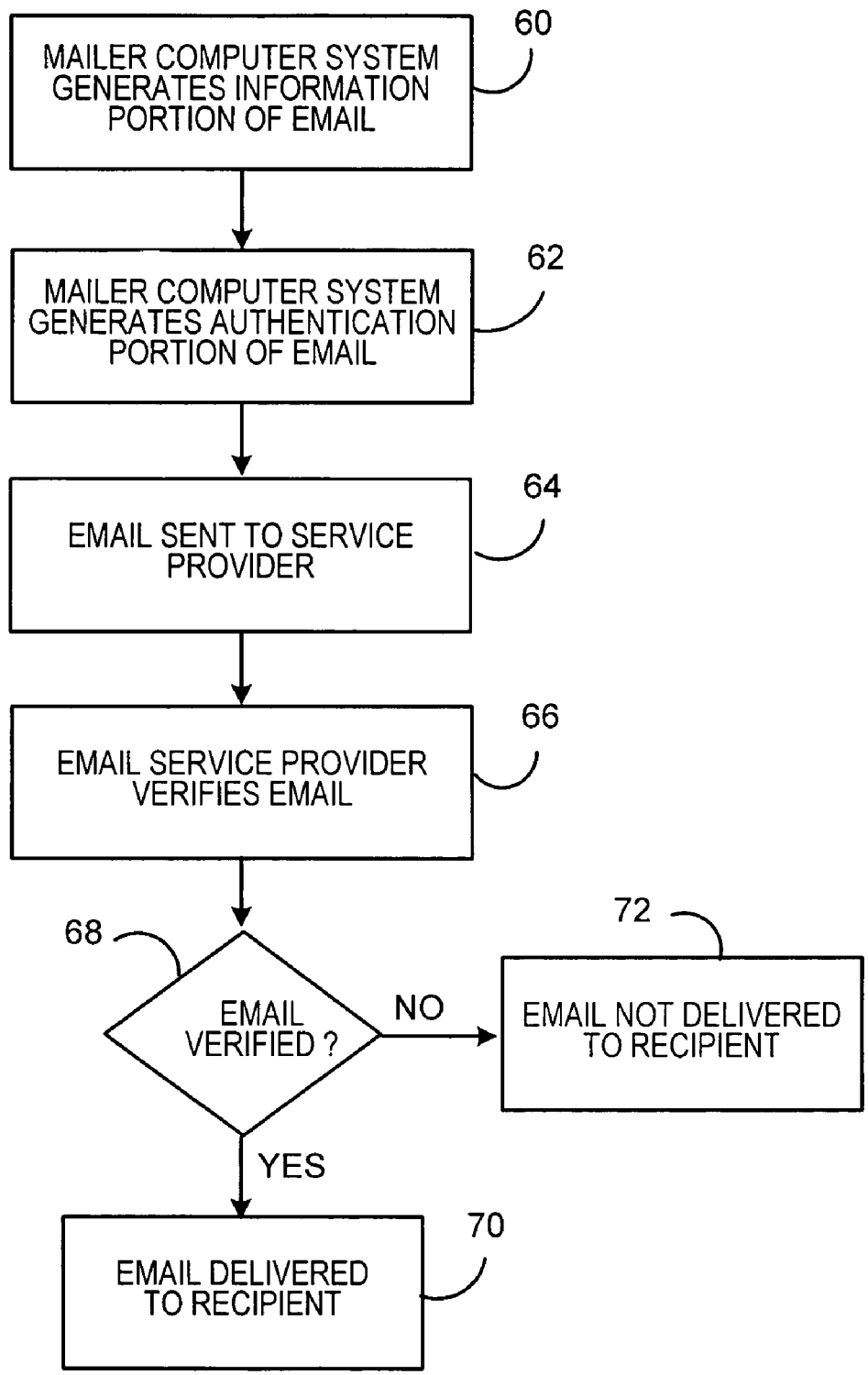
FIG. 3 is a flow diagram of the operation of the system illustrated in FIG. 1 for generating and sending an e-mail to an opted-in recipient.

FIG. 3 illustrates in flow diagram form the process of generating and sending and e-mail to an opted-in recipient. When the business mailer desires to send an email to the now opted-in recipient, the mailer computer system 25 generates a certified opt-in email in the following manner. In step 60, the mailer computer system 25 generates an information portion of the certified opt-in email that may include, for example and without limitation, one or more of the email content, subject, header information, sender, recipient, and date. In step 62, the mailer computer system 25, using the secure cryptographic device 30, generates an authentication portion of the certified opt-in email that is securely cryptographically linked to the information portion in a manner that can later be verified using the certificate described above. In the particular embodiment being described, the authentication portion includes a digital signature of the information portion created using the private key of the recipient that was generated by the trusted third party computer system 35 (and stored by the secure cryptographic device 30). As is known in the art, a digital signature is typically created by creating a hash (preferably a one way hash) of the information to be signed (here the information portion of the email) and generating a signature using the hash and a private key (here the private key of the recipient). The certified opt-in email, once generated in the manner just described, is then transmitted in step 64 to the email service provider computer system 20 through the network 15.

The email service provider computer system 20, upon receipt of the certified opt-in email, will attempt in step 66 to verify the certified opt-in email, and will deliver the certified opt-in email to the recipient computer system if it can be verified. In particular, the email service provider computer system 20 will access from storage the certificate associated with the recipient and the business emailer in question (that was previously sent to it by the trusted third party computer system 35) and will determine whether the certificate can be verified. To do so, the email service provider computer system 20 will determine whether the certificate is still valid (i.e., not expired) and whether the signature in the certificate can be verified using the public key of the trusted third party. If the certificate can be verified (i.e., it has not expired and the signature in the certificate can be verified), then the email service provider computer system 20 will determine whether the authentication portion of the certified opt-in email can be verified using the public key of the recipient that is included in the certificate. In step 68 it is determined if the e-mail is verified, i.e., whether both the certificate and authentication portion are verified. If the e-mail can be verified, then in step 70 the certified opt-in email is delivered to the recipient computer system 10 through the network 15, preferably with some indicator (i.e., a predetermined icon) associated therewith that indicates that it can be trusted as being sent from an opt-in source. Upon seeing this indicator, the recipient will recognize that the email is from an opt-in source, thus increasing the likelihood that the recipient will open and read the email. If however, either the certificate or the authentication portion cannot be verified as just described, then in step 72 the email is not delivered to the recipient computer system 10. Optionally, if verification of an email fails, then in step 72 the email can be delivered to the recipient computer system 10 with an indication that the email failed verification, and therefore is not from an authorized opt-in source.

As noted above, in the present embodiment, the certificate created by the trusted third party computer system 35 is valid for only a specified period (e.g., one month). In other words, the certificate expires after a specified period (e.g., one month). As a result, any emails that are sent to the recipient by the mailer computer system 25 after the expiration of the specified period will not be delivered (or delivered with an indication of failed verification) because the certificate for the recipient and the business emailer will not be able to be verified. According to one aspect of the present embodiment, the trusted third party is adapted to periodically and automatically reissue the certificate (with a new expiration date) and send it to the email service provider computer system 20 for so long as the recipient desires to remain opted-in to the email list of the business mailer. As will be appreciated, the certificates are reissued before the expiration of the current certificates. In the event that the recipient no longer wishes to be a member of the opt-in email list of the business mailer, the recipient may visit a web site hosted by the trusted third party computer system 35 and opt-out of the list. In response to such an opt-out request, the trusted third party computer system 35 will not longer reissue the certificate associated with the recipient and the business mailer's opt-in list. As a result, any certified opt-in emails generated by the mailer computer system 25 and sent to the email service provider computer system 20 after the current expiration date of the current certificate will not be delivered to the recipient computer system (or delivered with an indication of failed verification) because the certificate stored by the email service provider computer system 20 will have expired and will not be able to be verified.

As an alternative, rather than having the recipient certificates expire after a specified period and be automatically reissued unless the recipient in question takes steps to opt-out, the trusted third party computer system 35 may maintain a database of revoked certificates for those recipients that have communicated a desire to opt out of an email list to the trusted third party computer system 35 (for example, by visiting a web site maintained by the trusted third party computer system 35). In such a case, the process of verifying a certificate as described herein (e.g., by the email service provider computer system 20) will include, rather than checking whether the certificate has expired, checking (i.e., via communications through the networks) whether the certificate in question is in the database of revoked certificates maintained by the trusted third party computer system 35. The remaining operation of the various embodiments described herein remains the same.

In an alternative embodiment, rather then using public key cryptography to create the certified opt-in email, secret key cryptography techniques may be used. In particular, when the recipient wishes to opt-in to the email list of the business mailer and is redirected through the network 15 to the trusted third party computer system 35 as described elsewhere herein, the trusted third party computer system 35, rather than generating a public key/private key pair for the recipient and the email list in question, instead generates a secret key and a certificate associated with the secret key. The trusted third party computer system 35 then sends the certificate (which includes the secret key preferably in a secure (e.g., encrypted) state) to the email service provider computer system 20 through the network 15, where it is stored. In addition, the trusted third party computer system 35 sends the secret key, preferably in a secure (e.g., encrypted) manner, to the mailer computer system 25 where it is stored by the secure cryptographic device 30. In this embodiment, when the business mailer desires to send an email to the recipient, the mailer computer system 25 (and in particular the secure cryptographic device 30) generates a certified opt-in email in the manner described elsewhere herein, except that instead of generating an authentication portion that includes a digital signature of the information portion created using the private key of the recipient, the authentication portion includes a keyed-hash message authentication code (HMAC) created using the information portion and the secret key that was generated by the trusted third party computer system 35. As is known in the art, the keyed-hash message authentication code (HMAC) is preferably created by hashing the information portion in combination with the secret key. In addition, in this embodiment, when the email service provider computer system 20 receives a certified opt-in email intended for the recipient from the mailer computer system 25, the certificate is verified by the email service provider computer system 20 as described elsewhere herein, and the authentication portion of the certified opt-in email is verified by the email service provider computer system 20 using the secret key that is included in the certificate. In particular, the email service provider computer system 20 will hash the information portion of the received email in combination with the secret key that it has previously received and stored for the recipient, and compare that hash to the authentication portion of the certified opt-in email. If a match exists, then authentication portion has been verified. As was the case with the public key/private key embodiment, the email service provider computer system 20 will only deliver the email to the recipient computer system 10 if both the certificate and the authentication potion of the email can be successfully verified. In a further alternative of this embodiment, the secret key may be a password provided to the trusted third party computer system 35 by the recipient when the recipient is redirected to the trusted third party computer system 35 as described elsewhere herein. Optionally, the secret key may be derived by any known method from a password provided by the recipient. For example, the secret key may be derived from a secure hash of the password concatenated with the recipient's email address and the mailer's email address.

In another alternative embodiment, rather than having either the public/private key pair or the secret key, whichever is applicable, be generated by the trusted third party computer system 35, such keys are instead generated by or pre-stored in the secure cryptographic device 30. In this embodiment, when a user desires to opt-in to the business mailer's email list, the public/private key pair or the secret key, whichever is applicable, is sent from the secure cryptographic device 30 to the trusted third party computer system 35, which in turn generates a certificate for the key and transmits the certificate to the email service provider computer system 20 as described elsewhere herein. The remaining operation of the system 5 (e.g., the creation and subsequent verification of a certified opt-in email) in this particular embodiment is as described elsewhere herein in connection with the other system embodiments.

In another alternative embodiment, the certificate as created in the manner or manners described elsewhere herein may be provided to both the email service provider 20 and the mailer computer system 25 or just the mailer computer system 25 by the trusted third party computer system 35. In such an embodiment, the mailer computer system 25 may be adapted to attempt to verify the certificate (in the manners described herein) of an intended recipient before creating a certified opt-in email for that recipient, and only create and send the certified opt-in email for that recipient if the certificate can be successfully verified. Thus, if the certificate is not valid (e.g., expired or been revoked as described elsewhere herein), the mailer computer system 25 will not attempt to send the email to the now opted-out recipient.

In still another alternative embodiment, certain functions performed by the email service provider computer system 20 as described herein, in particular the verification of certificates and authentication portions of the certified opt-in emails and the decision to present them to the recipient, may instead be performed by the email application that is resident on the recipient computer system 10.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of processing an email generated by an emailer and intended for a recipient, said emailer maintaining an opt-in email list, the method comprising:
  receiving said email in a computer system, said email including an information portion and an authentication portion, said authentication portion being generated from said information portion using a secret key associated with said recipient and said opt-in email list in a manner that causes said authentication portion to be securely cryptographically linked to said information portion, said secret key being derived from a password generated by said recipient while opting-in to said opt-in email list;
  obtaining a certificate generated by a trusted third party, said certificate being generated by said trusted third party in response to said recipient opting-in to said opt-in email list, said certificate including said secret key associated with said recipient and said opt-in email list;
  determining in said computer system whether said certificate can be verified;
  determining in said computer system whether said authentication portion can be verified using said secret key;
  said computer system providing said email to said recipient if said certificate and said authentication portion are successfully verified; and
  said computer system not providing said email to said recipient if either of said certificate and said authentication portion are not successfully verified.

2. The method according to claim 1, wherein said certificate expires after a specified time period, wherein said step of determining whether said certificate can be verified comprises determining whether said certificate has expired, and wherein said certificate cannot be successfully verified if it is determined that said certificate has expired.

3. The method according to claim 2, further comprising periodically receiving reissued certificates from said trusted third party for so long as said recipient has not instructed said trusted third party of a desire to opt-out of said opt-in email list, wherein each of said reissued certificates expires after a specified time period, wherein said step of obtaining said certificate comprises obtaining a most recently received one of said reissued certificates, said certificate being said most recently received one of said reissued certificates.

4. The method according to claim 1, wherein said trusted third party maintains a list of revoked certificates, wherein said certificate will be placed on said list of revoked certificates if said recipient instructs said trusted third party of a desire to opt-out of said opt-in email list, wherein said step of determining whether said certificate can be verified comprises determining whether said certificate is on said list, and wherein said certificate cannot be successfully verified if it is determined that said certificate is on said list.

5. A method of adding a recipient to an opt-in email list maintained by an emailer and generating an email intended for said recipient, the method comprising:
  receiving in a computer system a request from said recipient to be added to said opt-in email list;
  directing said recipient to a trusted third party, wherein said trusted third party generates a certificate in response thereto, said certificate including a secret key associated with said recipient and said opt-in email list, said secret key being derived from a password generated by said recipient while opting-in to said opt-in email list;

generating said email in said computer system, said email including an information portion and an authentication portion, said authentication portion being generated in said computer system by a secure cryptographic device from said information portion using said secret key associated with said recipient and said opt-in email list in a manner that causes said authentication portion to be securely cryptographically linked to said information portion, said secret key being stored by said secure cryptographic device; and sending said email to said recipient;

wherein said certificate is provided by said trusted third party to at least one of an email service provider of said recipient and an email application of said recipient, and wherein said email is provided to said recipient by either of said email service provider and said email application of said recipient only if said either of said email service provider and said email application is able to successfully verify said certificate and successfully verify said authentication portion using said secret key.

6. The method according to claim 5, wherein said secret key is generated by said trusted third party after said directing step.

7. The method according to claim 5, wherein said directing step further comprises providing said secret key to said trusted third party.

8. The method according to claim 5, wherein said certificate expires after a specified time period, wherein said either of said email service provider and said email application determines whether said certificate can be verified by determining whether said certificate has expired, and wherein said certificate cannot be successfully verified if it is determined that said certificate has expired.

9. The method according to claim 5, wherein said trusted third party maintains a list of revoked certificates, wherein said certificate will be placed on said list of revoked certificates if said recipient instructs said trusted third party of a desire to opt-out of said opt-in email list, wherein said either of said email service provider and said email application determines whether said certificate can be verified by determining whether said certificate is on said list, and wherein said certificate cannot be successfully verified if it is determined that said certificate is on said list.

10. A method of adding a recipient to an opt-in email list maintained by an emailer and generating an email intended for said recipient, the method comprising:

receiving a request in a computer system from said recipient to be added to said opt-in email list;

directing said recipient to a trusted third party, wherein said trusted third party generates a certificate in response thereto, said certificate including a secret key associated with said recipient and said opt-in email list, said secret key being derived from a password generated by said recipient while opting-in to said opt-in email list;

obtaining said certificate and determining in said computer system whether said certificate can be verified;

generating said email in said computer system if said certificate can be verified, said email including an information portion and an authentication portion, said authentication portion being generated by a secure cryptographic device from said information portion using said secret key associated with said recipient and said opt-in email list in a manner that causes said authentication portion to be securely cryptographically linked to said information portion, said secret key being stored by said secure cryptographic device; and sending said email to said recipient;

wherein said email is provided to said recipient by either of an email service provider of said recipient or an email application of said recipient only if said either of said email service provider and said email application is able to successfully verify said authentication portion using said secret key.

11. The method according to claim 10, wherein said secret key is generated by said trusted third party after said directing step.

12. The method according to claim 10, wherein said directing step further comprises providing said secret key to said trusted third party.

13. The method according to claim 10, wherein said certificate expires after a specified time period, wherein said step of determining whether said certificate can be verified comprises determining whether said certificate has expired, and wherein said certificate cannot be successfully verified if it is determined that said certificate has expired.

14. The method according to claim 13, further comprising periodically receiving reissued certificates from said trusted third party for so long as said recipient has not instructed said trusted third party of a desire to opt-out of said opt-in email list, wherein each of said reissued certificates expires after a specified time period, wherein said step of obtaining said certificate comprises obtaining a most recently received one of said reissued certificates, said certificate being said most recently received one of said reissued certificates.

15. The method according to claim 10, wherein said trusted third party maintains a list of revoked certificates, wherein said certificate will be placed on said list of revoked certificates if said recipient instructs said trusted third party of a desire to opt-out of said opt-in email list, wherein said step of determining whether said certificate can be verified comprises determining whether said certificate is on said list, and wherein said certificate cannot be successfully verified if it is determined that said certificate is on said list.

* * * * *